(12) United States Patent
Bodin et al.

(10) Patent No.: US 7,027,073 B2
(45) Date of Patent: Apr. 11, 2006

(54) VIRTUAL CAMERAS FOR DIGITAL IMAGING

(75) Inventors: William Kress Bodin, Austin, TX (US); Derral Charles Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 09/961,993

(22) Filed: Sep. 24, 2001

(65) Prior Publication Data
US 2004/0218068 A1 Nov. 4, 2004

(51) Int. Cl.
G09G 5/00 (2006.01)
H04N 5/76 (2006.01)
H04N 9/083 (2006.01)

(52) U.S. Cl. ............ 345/629; 348/271; 348/231.2
(58) Field of Classification Search ........ 345/629–641; 348/261
See application file for complete search history.

(56) References Cited

U.S. PATENT DOCUMENTS

| | | | |
|---|---|---|---|
| 5,729,471 A | 3/1998 | Jain et al. | |
| 6,144,375 A | 11/2000 | Jain et al. | |
| 6,199,014 B1 * | 3/2001 | Walker et al. | 701/211 |
| 6,321,158 B1 * | 11/2001 | DeLorme et al. | 701/201 |
| 2003/0095135 A1 * | 5/2003 | Kaasila et al. | 345/613 |
| 2003/0095193 A1 * | 5/2003 | May et al. | 348/231.3 |

FOREIGN PATENT DOCUMENTS

| | | |
|---|---|---|
| EP | 0797173 | 9/1997 |
| JP | 07-318894 | * 12/1995 |
| JP | 08-161398 | 6/1996 |
| JP | 2000-197031 | 7/2000 |
| JP | 2000-232660 | 8/2000 |
| JP | 2000-288248 | 10/2000 |
| WO | WO 99/65223 | 12/1999 |

OTHER PUBLICATIONS

Microsoft Terraserver site, archived by the Internet Archive, from Apr. 17, 1999☐☐http://web.archive.org/web/19990417081148/terraserver.com/nav.htm.*

(Continued)

*Primary Examiner*—Michael Razavi
*Assistant Examiner*—Eric Woods

(57) ABSTRACT

A method of digital imaging, the method implemented through use of a virtual camera, wherein the virtual camera includes automated computing machinery operating under software program control, wherein the virtual camera includes a user interface, the method includes creating an image request for a digital image, wherein the image request includes an image request data structure representing and describing the digital image, wherein the image request data structure includes image request data elements, wherein the image request data elements include data elements for location coordinates and a data element for view direction, and storing the image request data elements in the image request.

51 Claims, 9 Drawing Sheets

OTHER PUBLICATIONS

Barclay et al. "Microsoft Terraserver". Technical Report, MSR-TR-98-17. Jun. 1998. Available on web at http://arxiv.org/pdf/cs/9809011.*

Drucker, S.M., et al., Proceedings of Graphics Interface '94, pp. 190-199. Presented at a conference in Banff, Canada on May 18-20, 1994.

Proceedings of the International Conference on Multimedia Computing and Systems, pp. 358-361. Presented in Hiroshima, Japan on Jun. 17-23, 1996.

IBM Technical Disclosure Bulletin, vol. 40, No. 9, Sep. 1997, pp. 79-81.

* cited by examiner

VIRTUAL CAMERAS FOR DIGITAL IMAGING

BACKGROUND OF THE INVENTION

1. Field of the Invention

The field of the invention is virtual cameras for digital imaging, or, more specifically, methods, computer program products, and products for making and using virtual cameras to create digital images.

2. Description of the Related Art

The state of the art of digital photography is that creation of a snapshot using a traditional camera, either a digital camera or a film camera, requires that a camera be physically present near the subject to be photographed at the time when the photograph is to be taken. The requirement for physical presence stems from the need to illuminate a physical imaging device with light reflected from a subject to be photographed or imaged. Physical imaging devices include, for example, charge coupled devices for digital cameras and film in film cameras. Because of the need to illuminate an imaging device with light actually reflected from the subject to be imaged, there is no way in current art to create a snapshot of a subject that is spatially out of view of the camera. Moreover, snapshots in current art are snapshots of an object as it exists at the time of the snapshot. Because of the need to illuminate an imaging device with light actually reflected from the subject to be imaged, there is no way in current art to create a snapshot of a subject at a remote point in time. It would be useful, however, to be able to create a snapshot of a subject not within spatial view of a camera. It would be useful to be able to create a snapshot of a subject as the subject appeared at a time other than the moment when the snapshot is taken.

SUMMARY OF THE INVENTION

Typical embodiments of the invention include a method of digital imaging implemented through use of a virtual camera. In typical embodiments, the virtual camera includes automated computing machinery operating under software program control. In typical embodiments, the virtual camera includes a user interface. Typical embodiments include creating an image request for a digital image, wherein the image request includes an image request data structure representing and describing the digital image, wherein the image request data structure includes image request data elements, wherein the image request data elements include data elements for location coordinates and a data element for view direction. Typical embodiments also include storing the image request data elements in the image request.

In many embodiments of the invention, the image request data elements include data elements for zoom, exposure, date, and time. In some embodiments, the image request data elements also include data elements for a network address of the virtual camera, delivery instructions, a user account identification code, and a device type.

Many embodiments of the invention include acquiring at least one of the image request data elements through the user interface. In some embodiments, the user interface includes a computer video screen and keyboard on a personal computer. In some embodiments, the user interface includes a touch-sensitive pad on a personal digital assistant.

In some embodiments of the invention, the virtual camera includes a parameter store, and the parameter store includes non-volatile computer memory. Exemplary embodiments include acquiring at least one of the image request data elements from a parameter store. Many embodiments also include entering through a user interface, into the parameter store, default values for the image request data elements.

Some exemplary embodiments of the invention include storing the image request in a snapshot queue, the snapshot queue including computer memory in the virtual camera. Many exemplary embodiments include coupling, for data communications, the virtual camera to a Web site for imaging for virtual cameras, and communicating the image request from the virtual camera to a Web site for imaging for virtual cameras. In some embodiments, the virtual camera includes a display device. Some embodiments also include receiving a digital image from the Web site; and displaying the digital image on the display device.

In some embodiments of the invention, the image request data elements include at least one data element for location coordinates, and in some embodiments, the virtual camera includes a GPS receiver. Such embodiments usually include reading location coordinates values from the GPS receiver and storing the location coordinates values in the image request. In some embodiments, the image request data elements include a data element for view direction and the virtual camera includes a digital compass. Such embodiments typically include reading a view direction value from the digital compass and storing the view direction value in the image request. In other embodiments, the image request data elements further include data elements for date and time and the virtual camera includes a digital clock. Such embodiments typically include reading date and time values from the digital clock and storing the date and time values in the image request.

In many embodiments of the invention, the image request data elements include a data element for zoom and the virtual camera includes a lens assembly having a first moveable element and a zoom sensor. In such embodiments, the zoom sensor typically includes a potentiometer having a wiper and a wiper contact, with the wiper moveably coupled to the first moveable element of the lens assembly. Such embodiments typically include an analog-to-digital converter electrically coupled to the wiper contact of the potentiometer.

In many embodiments of the invention, the image request data elements include a data element for zoom, and the virtual camera includes a zoom sensor. Such embodiments of the invention typically include reading a zoom value from the zoom sensor and storing the zoom value in the image request. In typical embodiments, the image request data elements include a data element for exposure, and the virtual camera includes a lens assembly having a second moveable element. In such embodiments, the second moveable element typically has the capability of adjusting the amount of light passing through a light path through the lens assembly and an exposure sensor. In such embodiments, the exposure sensor includes a photocell positioned in the light path through the lens assembly, the photocell includes an electrical output contact, and an analog-to-digital converter electrically coupled to the electrical output contact of the photocell. In many embodiments, the image request data elements include a data element for exposure, and the virtual camera includes an exposure sensor. Such embodiments typically include reading an exposure value from the exposure sensor and storing the exposure value in the image request.

The foregoing and other objects, features and advantages of the invention will be apparent from the following more particular description of exemplary embodiments of the invention, as illustrated in the accompanying drawings wherein like reference numbers represent like parts of the invention.

DETAILED DESCRIPTION OF EXEMPLARY EMBODIMENTS

Introduction

Figure 1:
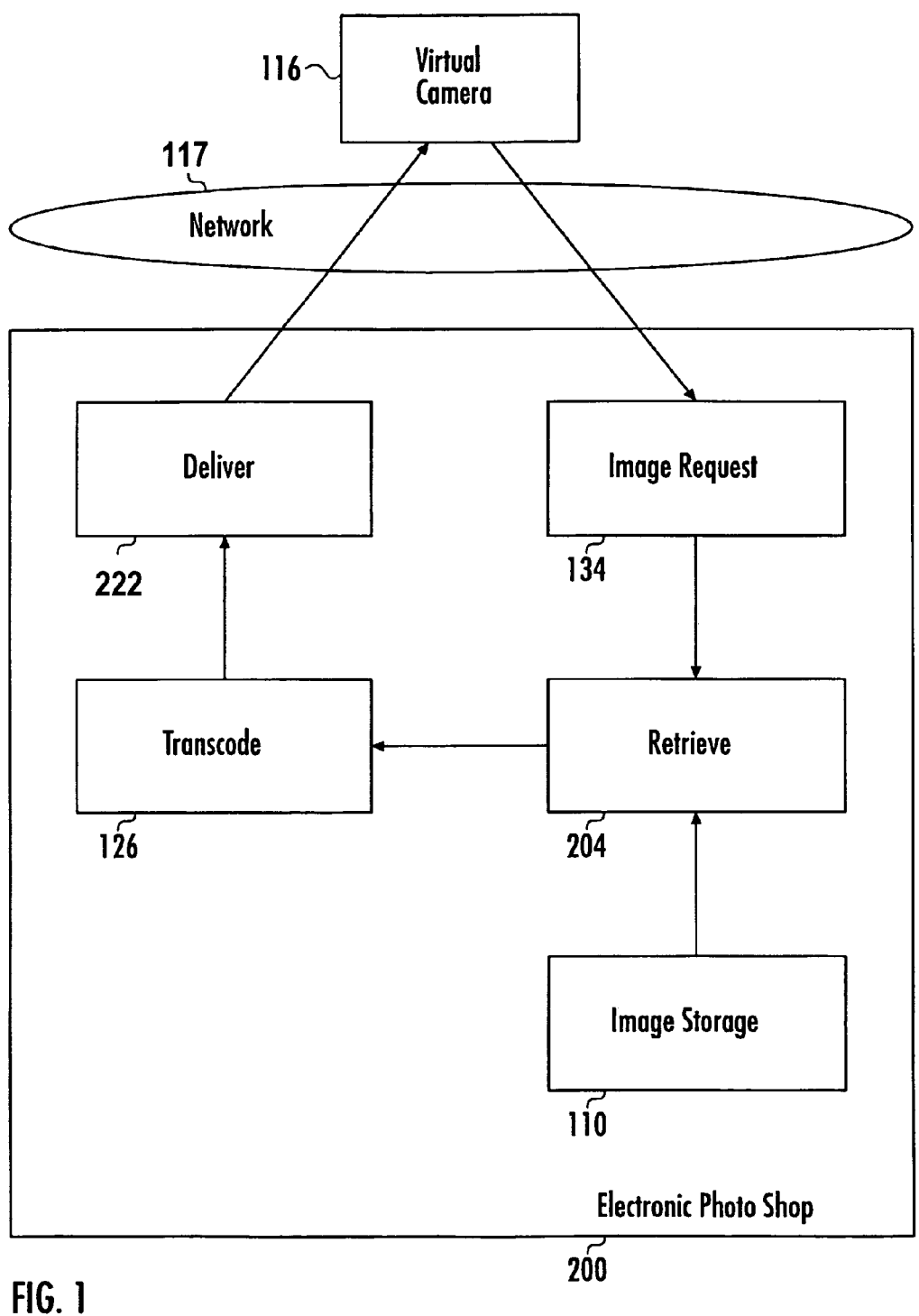
FIG. 1 is a block diagram of a general example embodiment of the system aspect of the invention.

The present invention is described primarily in terms of methods for providing images for virtual cameras. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the following terms are used as defined here. Other terms are defined elsewhere in the specification and used as defined.

In this specification, the terms "field," "data element," and "attribute" are used as synonyms, referring to individual elements of digital data. Aggregates of data elements are referred to as "records" or "data structures." Aggregates of records are referred to as "files" or "tables." Aggregates of files are referred to as "databases." Definitions of complex data structures that include member methods, functions, or software routines in addition to data elements are referred to as "classes." Instances of complex data structures are referred to as "objects" or "class objects."

"Coupled for data communications" means any form of data communications, wireless, infrared, radio, internet protocols, HTTP protocols, email protocols, networked, direct connections, dedicated phone lines, dial-ups, serial connections with RS-232 or Universal Serial Buses, hard-wired parallel port connections, and other forms of data communications as will occur to those of skill in the art.

Couplings for data communications wireless modems using analog cellular channels, and communications using CDPD, Cellular Digital Packet Data. Couplings for data communications include wireless access points, wireless network ports according to IEEE standard 802.11, and Bluetooth piconet ports as standardized by the Bluetooth Special Interest Group, and HomeRF ports as standardized by the HomeRF Working Group, as well as infrared ports. Couplings for data communications include Bluetooth piconets implemented in accordance with the well known de facto industry standard known as the "Bluetooth Specification," a specification for short range radio links among mobile personal computers, mobile phones, and other portable devices.

The term "network" is used in this specification to mean any networked coupling for data communications. Examples of networks useful with the invention include intranets, extranets, internets, local area networks, wide area networks, and other network arrangements as will occur to those of skill in the art. The use of any networked coupling among virtual cameras, electronic photo shops, and devices coupled through designated network addresses is well within the scope of the present invention. In embodiments of the kind illustrated, virtual camera typically includes devices implemented as automated computing machinery, a Web browser, and an internet client having a network address. There is no requirement within the present invention that the internet client have any particular kind of network address.

"Network address" means any network address useful to locate a virtual camera or a designated network address on any network. Network address includes any internet protocol address useful to locate an internet client, a browser, a virtual camera, or a designated network address on the Internet. Network addresses useful with various embodiments of the invention include local internet protocol addresses, private internet protocol addresses, and temporary Internet addresses assigned to a Web client by a DHCP server, and permanent, official registered Internet addresses associated with domain names.

A "store" is one or more storage locations in computer memory. "Storing" is writing data to storage locations in computer memory, typically implemented by a processor operating under stored program control.

"URL" means Uniform Resource Locator, a standard method of associating World Wide Web data locations with network addresses for data communications.

"World Wide Web," or more simply "the Web," refers to the system of internet protocol ("IP") servers that support specially formatted documents, documents formatted in a language called "HTML" for HyperText Markup Language. The term "Web" is used in this specification also to refer to any server or connected group or interconnected groups of servers that implement the HyperText Transport Protocol, "HTTP," in support of URLs and HTML documents, regardless whether such servers or groups of servers are coupled to the World Wide Web as such.

"Browser" means a Web browser, a software application for locating and displaying Web pages. Typical browsers today can display text, graphics, audio and video.

A "Web site" is a location on the World Wide Web. Web sites are identified by domain names that resolve to Internet addresses. Web sites include storage locations identifiable by URLs. Web sites are implemented in, on, and as part of Web servers, that is, HTTP servers. Web sites are aggregations of computer software installed and operating on computer hardware.

DETAILED DESCRIPTION

Turning now to FIG. 1, a first aspect of the invention is seen illustrated as a system for imaging for a virtual camera (116). The embodiment illustrated includes a Web site implemented to function as an electronic photo shop (200). The term 'electronic photo shop' is a fanciful descriptive phrase intended to be reminiscent of traditional photo shops where film bearing optical images was sent for developing, printing, and delivery. In an electronic photo shop, byway of analogy, image requests (134) for digital images are sent for retrieval (204), transcoding (126), and delivery (222).

Figure 4:
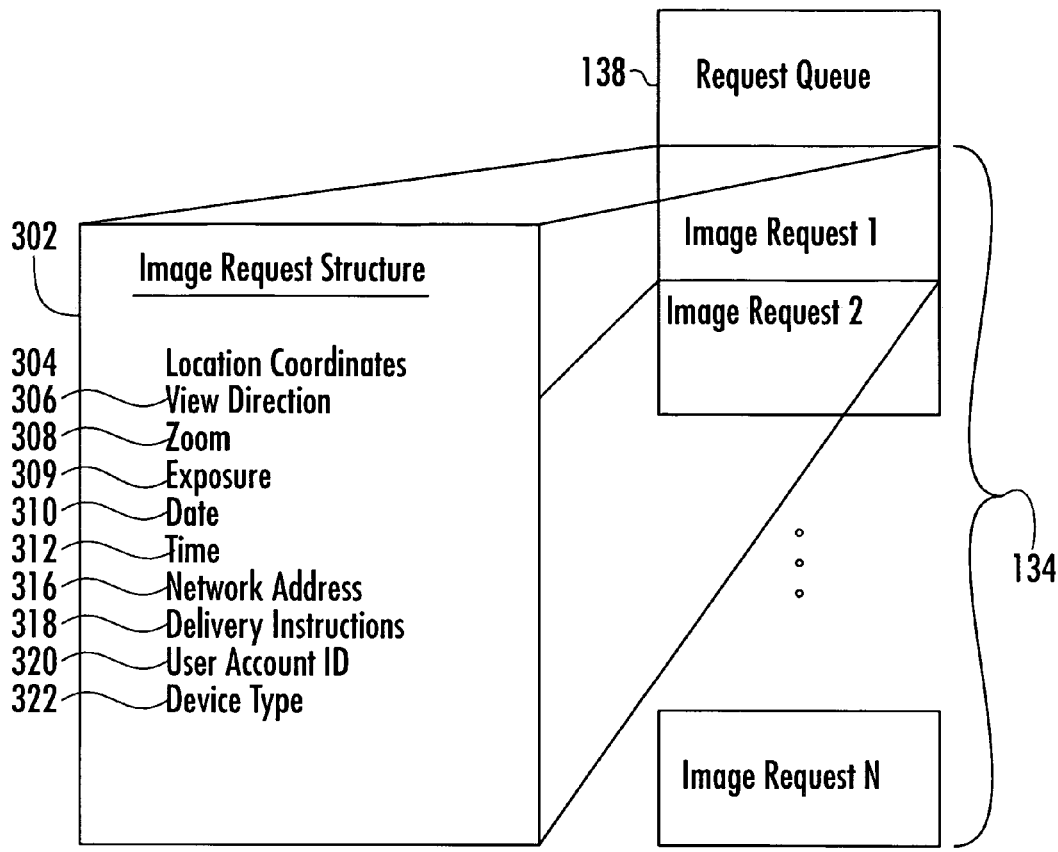
FIG. 4 is an example data structure diagram useful in exemplary embodiments of image requests.

An image request is a data structure representing a request for preparation of a digital image of a view in a particular direction from a particular location. Image requests are communicated across networks to electronic photo shops of the invention. FIG. 4 illustrates example embodiments of data structures useful as image requests in various embodiments of the invention. The example embodiment of image request data structure illustrated in FIG. 4 includes data elements representing location coordinates (304), view direction (306), zoom (308), exposure (309), date (310), time (312), network address (316), delivery instructions (318), user account identification code (320), and a device type (322).

Location coordinates (304) are standard data representations of latitude and longitude, and, optionally, as described below, elevation. View direction (306) typically comprises a standard data representation of a compass direction from the location coordinates to a subject for imaging. In addition to a two-dimensional indication of direction upon the surface of the earth, view direction optionally includes a vertical component such as elevation, declination, or any other measure of vertical view angle.

Zoom (308) is an indication of magnification. Alternatively, zoom is considered an indication of relation between the position of a viewer of an image and the size of the image. In some embodiments, in a fashion analogous to film cameras, zoom is expressed in terms of lens focal length. In embodiments of the present invention that measure zoom in terms of lens focal length, the lens focal length is a conventional or scaled representation in which the standard is generally taken that 45 millimeters gives a 'normal' view, focal lengths of less than 45 millimeters give wide angle views, and focal lengths of more than 45 millimeters give close-up views. The lens focal length is said to be conventional or scaled in such embodiments because, of course, in many such embodiments, using, as they do, virtual cameras, often there are no physical lenses and there are no physical focal lengths.

Exposure (309) is a virtual measure of the darkness or lightness of an image, analogous to what is measured by lens aperture and shutter speed in a film camera. Exposure in embodiments of the present invention, however, is a virtual measure in the sense that, in many embodiments of virtual cameras, there is no actual lens, no lens aperture, no actual shutter, and no shutter speed.

In the detailed example embodiment of image request data structure as illustrated in FIG. 4, date (310) and time (312) are conventional data representations of the date and time of an image retrieved and transcoded into a virtual snapshot. Within the present invention, there is no requirement that the date and time of the image be the date and time of the virtual snapshot. A user of a virtual camera can take a virtual snapshot at noon of a subject with the resulting image being for midnight, and vice versa. A user of a virtual camera can take a virtual snapshot of a public park at noon in July, when the trees are covered with leaves, and specify in the date field of the image request that the image is to be retrieved and transcoded for January 20 at 4:00 p.m. local time, so that the image depicts the park with late afternoon light on a winter day, with no leaves on the trees.

In image request data structures as illustrated in FIG. 4, the network address (316) is an internet protocol address or a Web address. In many embodiments, the virtual camera includes a browser, often including a wireless Internet connection. Web addresses in some of these embodiments are dynamically assigned to the virtual camera when the camera's browser connects to the Internet, typically by a download from a DHCP server. In other embodiments of this kind, the virtual camera has a permanently assigned Web address associated with the camera, as, for example, a Web addressed resolved through a registered domain name.

In image request data structures of the kind illustrated in FIG. 4, delivery instructions (318) include data representations of user choice regarding delivery of a transcoded image, including, for example, whether the image is to be delivered by download directly to the virtual camera, delivered by email, or delivered by recording an image on a recording medium such as a CD or DVD and mailing it to a user.

Many image request data structures of the kind illustrated in FIG. 4 include a user account identification code (320) which is used in various embodiments of the invention to identify user account records that store information regarding user, including, for example, user preferences regarding image processing and delivery and default information regarding device types for particular users. In addition, many image request data structures of the kind illustrated in FIG. 4 include a field identifying a device type (322) for a virtual camera. Device types of virtual cameras useful in typical embodiments include personal computers, personal digital assistants, and special purpose devices designed and constructed specifically for use as virtual cameras. In fact, device types useful as virtual camera include any device or computer capable of coupling for data communications through a network to an electronic photo shop and transmitting to the electronic photo shop, through the network, image requests.

Figure 2:
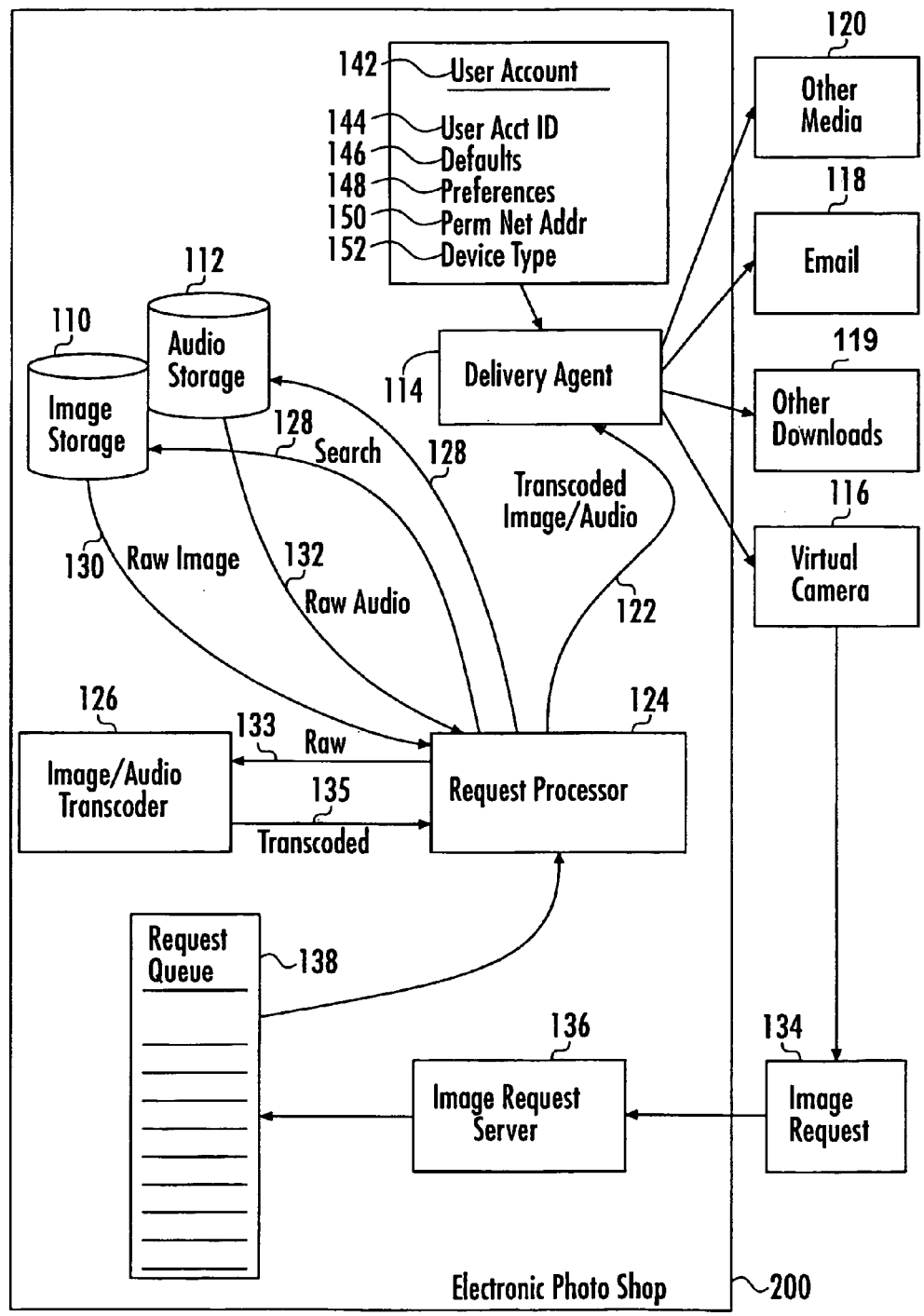
FIG. 2 is a more detailed system diagram illustrating typical example embodiments of the invention.

Turning now to FIG. 2, a more detailed embodiment of the invention is shown as a system for imaging for virtual cameras. The embodiment shown in FIG. 2 is implemented as a Web site configured as an electronic photo shop, including an image request server (136). The image request server is software installed and running on computer hardware configured as a server, coupled for data communications to a virtual camera (116), the image request server being programmed to receive image requests (134) and pass them along, for example, through a queue (138), to a request processor (124) for further processing In many embodiments of the present invention, an electronic photo shop can provide audio clips to accompany transcoded images. In embodiments of the kind shown in FIG. 2, audio files are stored (112) in computer memory in a fashion similar to image storage (110). Such computer memory stores (112, 110) are databases containing digital audio and image files, or pointers to actual locations of such files, indexed or sorted according to various pertinent attributes, including, for example, location coordinates and view direction. Such computer memory stores in some embodiments are sorted or indexed also according to zoom, exposure, date, or time. Such computer memory stores are in various embodiments sorted or indexed in other ways as will occur to those of skill in the art, all such ways being well within the scope of the present invention.

Typical embodiments of the kind shown in FIG. 2 include a request processor (124). The request processor is a software subsystem installed and running on computer hardware, the request processor programmed to search (128) audio and image stores (110, 112), and retrieve from such computer memory stores, raw images (130) and raw audio clips (132) corresponding to an image request. In typical embodiments, a request processor then provides the raw images and audio clips to a transcoder (126) for transcoding. The transcoder (126) transcodes the images and audio and returns transcoded images and transcoded audio (135) to the request processor. The request processor then typically provides the transcoded images and audio clips to a delivery agent (114) for delivery in accordance with user instructions or preferences.

In typical embodiments of the kind shown in FIG. 2, a transcoder (126) is a software subsystem installed and running on computer hardware and programmed to receive raw audio and a raw image (133) and transcode them according to an image request. That is, the transcoder typically will adjust an image to accord with the zoom, exposure, date, time, and device type in accordance with the values of these fields in an image request. Device type indications include, for example, whether a particular virtual camera supports audio, whether a particular virtual camera has a display screen, the size of the display screen on the virtual camera, whether the display screen on a virtual camera supports color, and so on.

In addition to transcoding according to data element values in an image request, the transcoder also operates in dependence upon user preferences (148) and defaults (146) set in user account records (142). That is, for example, in the embodiment shown in FIG. 2, the transcoder (126) infers zoom, exposure, date, and time from user preferences in the absence of a setting for zoom, exposure, date, and time in the image request. That is, for example, a user sets in defaults or preferences in the user's account information (142) that in the absence of a zoom entry in an image request, the transcoder is to set the zoom to 25 millimeters, a wide angle view. This alternative is useful when, for example, the raw image is recorded in storage with a normal view corresponding to a 45 millimeter focal length, which would be provided in the transcoded image, in the absence of an entry in the image request, but for the user preference or default setting.

Similarly, defaults are set for date and time, so that, for example, in the absence of a setting in the image request, the transcoder defaults to producing images based upon the date and time when the image request is received. This example default setting for date and time, of course, is analogous to operation of a physical camera which makes snapshots of subjects as the subjects appear at the time of the snapshot.

Alternatively, for example: A user wants a series of images of subjects as they appear at 10:00 p.m. local time, but is only able to visit the location of the subject at 10:00 a.m. The user then sets a time default on the user's account to 10:00 p.m. and conveniently submits a series of image requests at 10:00 a.m. without bothering to enter time values for each request. Then the transcoder transcodes all the images in this example series to appear as if illuminated by light conditions normally prevalent at 10:00 p.m.

The example embodiment illustrated in FIG. 2 includes a delivery agent (114). The delivery agent in the example embodiment received the transcoded image, optionally with an audio clip, from the request processor (124). The delivery agent also is passed either a pointer to the image request or a copy of the image request. Either way, the delivery agent carries out its work in dependence upon the data in the image request, and, by reading a user account identification code from the image request, as at reference (320) on FIG. 4, the delivery agent also has access to user defaults (146) and preferences (148) regarding delivery. Users override defaults and preferences by including delivery instructions (reference 318 on FIG. 4) in image requests. Thus users through defaults, preferences, and delivery instructions effects delivery of transcoded images through any combination of downloads (119) from the delivery agent (114) to a virtual camera (116); from the delivery agent (114) to other media (120) such as CDs or DVDs and then through regular mail or courier services to a user's physical address; from the delivery agent through email to an email address (118), either the user's email address or any other email address at the user's option; and from the delivery agent (114) directly to other network addresses.

In various embodiments, server-side software and hardware, including electronic photo shops, commercial Websites, delivery agents, and request processors are coupled for data communications to virtual cameras, not necessarily at the same time, but at one time or another. The couplings for data communications take various forms depending on the embodiment, including for example, wireless network connections as well as standard USB (Universal Serial Bus) cable connections or RS-232 (EIA232) connections. The phrase "coupled for data communications" is defined above in this specification, although the definition is not limiting. Other forms of coupling for data communications will occur those of skill in the art, and all such forms are well within the scope of the present invention.

Downloading from the delivery agent (114) to the virtual camera typically includes downloading across a coupling for data communications to a particular network address where the virtual camera is located on a network, in many embodiments an internet, although the use of other kinds of networks is well within the scope of the invention. In many embodiments, a network address for a virtual camera is communicated to the delivery agent through a network address (reference 316 on FIG. 4) data element in an image request, particularly useful with temporary internet addresses dynamically assigned to the virtual camera by a DHCP server. In other embodiments, a virtual camera has a permanently registered internet address and a domain name, either or both on file (150) in a users account data record (142) in the electronic photo shop, which the deliver agent retrieves on the basis of the user's account identification (320 on FIG. 4) read from the image request. Similarly, in various embodiments, the user's email address or alternative email addresses are communicated to the delivery agent through delivery instructions (318 on FIG. 4) in image requests or retrieved from user account records (142).

As mentioned above, however, network couplings are not required as such. Embodiments are well within the invention that simply connect a virtual camera through a USB cable to a computer having a delivery agent running upon it, for purposes of downloading images to a virtual camera. For purposes of communicating image requests from a virtual camera to an image processor or electronic photo shop, it is well within the invention for embodiments simply to connect the camera through a USB cable or RS-232 cable to a computer having running upon it an electronic photo shop or an image request processor.

Figure 3:
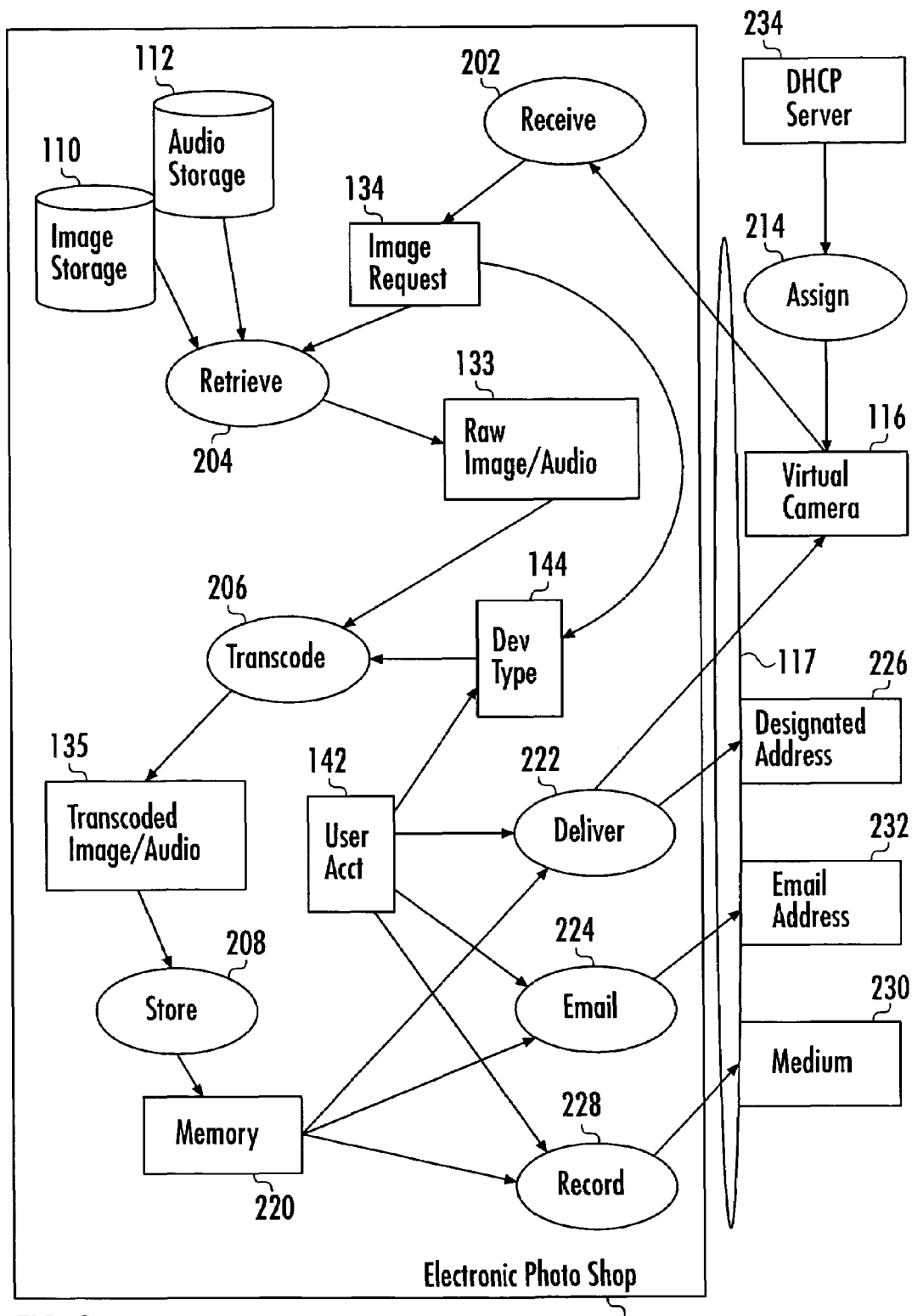
FIG. 3 is a control flow diagram illustrating method aspects of typical embodiments.

Turning now to FIG. 3, a further embodiment of the invention is shown as an example method of imaging for virtual cameras implemented through a Web site called an electronic photo shop. The embodiment shown in FIG. 3 includes receiving (202) in an electronic photo shop (200), from a virtual camera (116) coupled for data communications through a network (117) to the electronic photo shop, an image request (134). h typical embodiments, the image request includes a data structure including data elements specifying location coordinates and view direction (as shown at references 304 and 306 on FIG. 4). The illustrated example embodiment includes retrieving (204), in dependence upon the location coordinates and view direction, from among stored images (110), a raw image (133); transcoding (206) the raw image; and storing (208) the transcoded image in computer memory (220).

Figure 5:
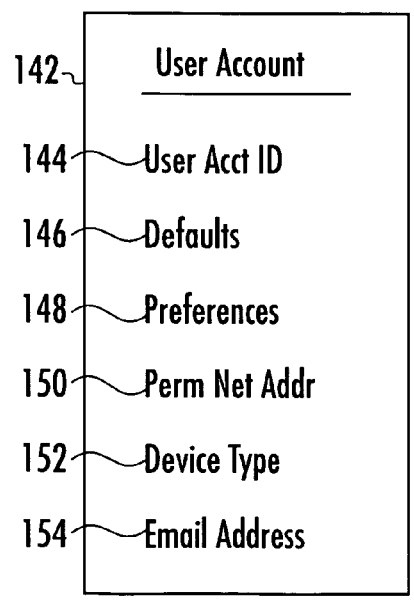
FIG. 5 is an example data structure diagram useful in exemplary embodiments of user account records.

In typical embodiments of the kind illustrated in FIG. 3, the image request (134) further includes a device type (144) for the virtual camera (116) and transcoding (206) is carried out in dependence upon the device type. The device type typically identifies such device attributes as whether the device supports graphic display, display screen size, whether the device supports color, whether the device supports audio, and so on. Other attributes of devices to be used as virtual cameras will occur to those of skill in the art, and the use of all such attributes is well within the scope of the present invention. In typical embodiments, the image request (134) further includes a user account identification code (as shown at reference 144 on FIG. 5). Typical embodiments, as shown in FIG. 3, include inferring a device type from user account records (142) in dependence upon the account identification code (144), and transcoding (206) in dependence upon the device type. Inferring a device type from user account records typically includes reading the account identification code from an image request, finding a user account record with the same account identification code, and reading from that user account record a device type.

As shown in FIG. 3, typical embodiments of the invention include delivering (222) a transcoded image (135) through a network (117) to a virtual camera (116). In many embodiments, the network (117) is an internet, the electronic photo shop is implemented as a Web server or includes a Web server, the virtual camera includes a browser, and delivering the transcoded image (135) through the network (117) to the virtual camera (116) includes delivering the transcoded image through the network to the virtual camera by use of HTTP messages. In typical embodiments the image request (134) includes a network address (as shown at reference 316 on FIG. 4) and delivering the transcoded image through the network to the virtual camera further includes delivering the transcoded image through the network to the virtual camera at the network address.

Typical embodiments of the invention include coupling for data communications the virtual camera to the electronic photo shop, wherein coupling for data communications the virtual camera to the electronic photo shop includes dynamically assigning (214) the network address. Dynamically assigning the network address includes receiving a temporary network address in accordance with protocols from a DHCP server, meaning a Dynamic Host Configuration Protocol server.

In typical embodiments, the image request (134) includes a user account identification code (as at reference 320 on FIG. 4). Typical embodiments include inferring, in dependence upon the account identification code, from user account records, a permanent network address (as at reference 150 on FIG. 5) for the virtual camera (116). In this sense, inferring a permanent network address includes reading an account identification code from an image request (as reference 320 on FIG. 4), finding a user account record with the same account identification code (as reference 144 on FIG. 5), and reading a permanent network address (reference 150 on FIG. 5) from the user account record.

In typical embodiments, delivering the transcoded image (135) through the network (117) to the virtual camera (116) includes delivering the transcoded image through the network to the virtual camera at the permanent network address. Typical embodiments also include delivering (222) the transcoded image (135) through the network to a designated network address (226), the designated network address being, for example, some network address other than the network address of the virtual camera. Examples of designated network addresses useful with the present invention include storage locations on user's Web sites identified by URLs including domain names resolving to network addresses. Many other forms of designated network addresses other than the network address of a virtual camera will occur to those of skill in the art, and the use of all such alternative forms of designated network addresses is well within the scope of the present invention.

Typical embodiments, as shown on FIG. 3, further include optional additional modes of delivery such as emailing (224) the transcoded image (135) and recording (228) the transcoded image (135) on a recording medium (230). Other modes of delivery will occur to those of skill in the art, and all such modes of delivery of transcoded images and audio are well within the scope of the present invention.

Typical embodiments of the kind illustrated in FIG. 3 include retrieving (204), in dependence upon the location coordinates and view direction, from among stored audio files (112), a raw audio file (133); transcoding (206) the raw audio file; and storing the transcoded audio file (135) in computer memory(220). Typical embodiments include delivering (222) the transcoded image and the transcoded audio file (135) to the virtual camera (116) through the network by use of HTTP messages and delivering (222) the transcoded audio file through the network to a designated network address (226). Typical embodiments further include emailing (224) the transcoded audio file to an email address (232) and recording (228) the transcoded audio file on a recording medium (230).

Figure 6:
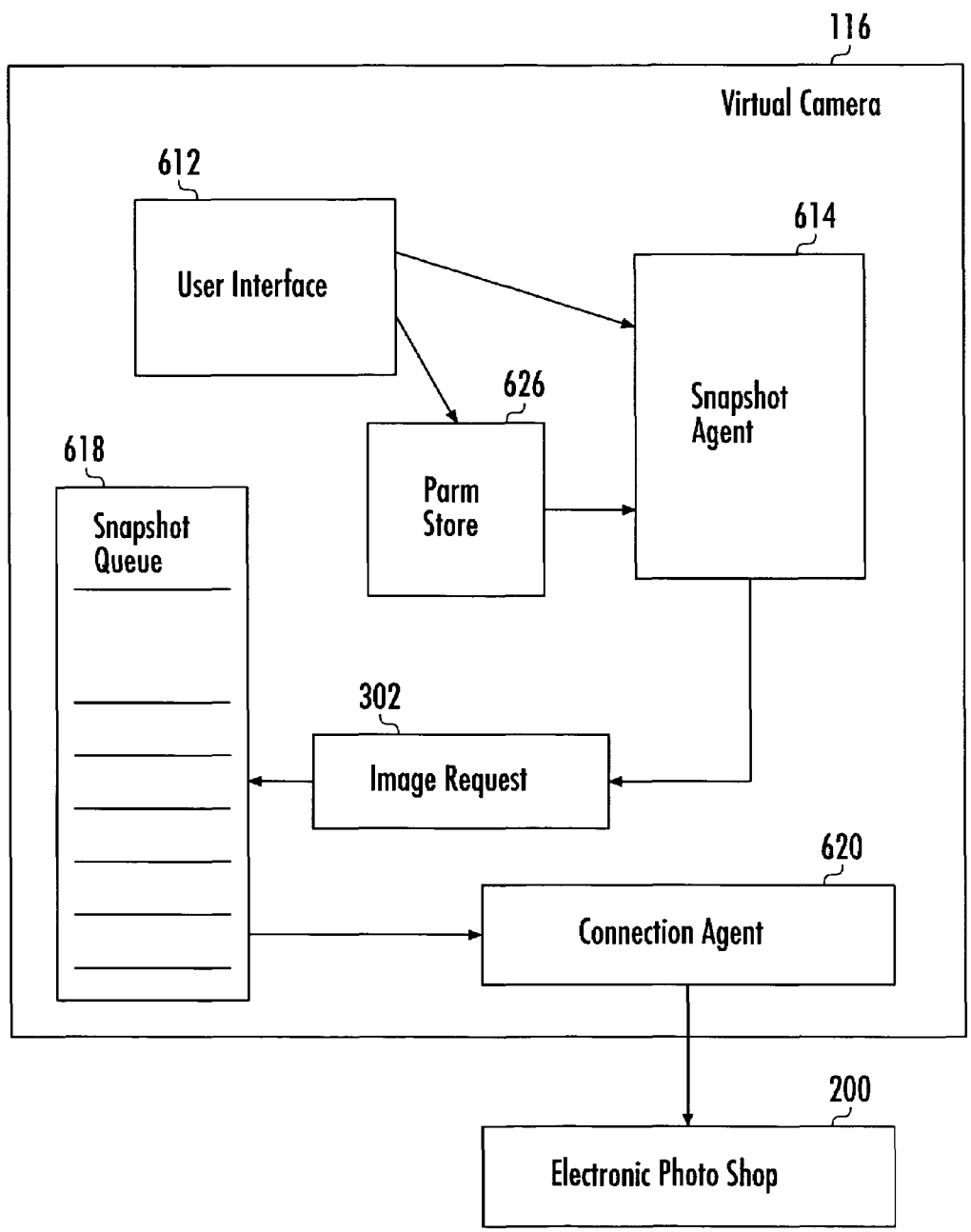
FIG. 6 is a block diagram of an example embodiment of a virtual camera including an example connection to an electronic photo shop.

Turning now to FIG. 6, a further aspect of the invention is shown as a virtual camera (116). A typical exemplary virtual camera of the present invention is automated computing machinery comprising one or more microprocessors coupled to computer memory, with one or more software agents installed and running upon the microprocessors. The illustrated embodiment of FIG. 6 includes a user interface (612), a parameter store (626), a snapshot agent (614), a snapshot queue (618), and a connection agent (620).

Embodiments if virtual cameras include a wide variety of physical forms, ranging, for example, from personal computers to personal digital assistants to elaborate purpose built devices. In embodiments as personal computers, examples of user interfaces (612) include mice, display screens, keyboards, and so on. In embodiments as personal digital assistants, user interface (612) includes keypads, touch-sensitive screens, and liquid crystal displays.

Parameter stores (626) in typical embodiments are computer memory dedicated to storing default values for image request data elements. Snapshot queues (618) are computer memory dedicated to storing one or more image requests. Snapshot agents are collections of computer programs capable of creating image requests (302); gathering and writing into the image requests the image request data elements needed to comprise a request for an image to be directed to an electronic photo shop; and storing the image requests in a snapshot queue to await transmission to the electronic photo shop.

Figure 7:
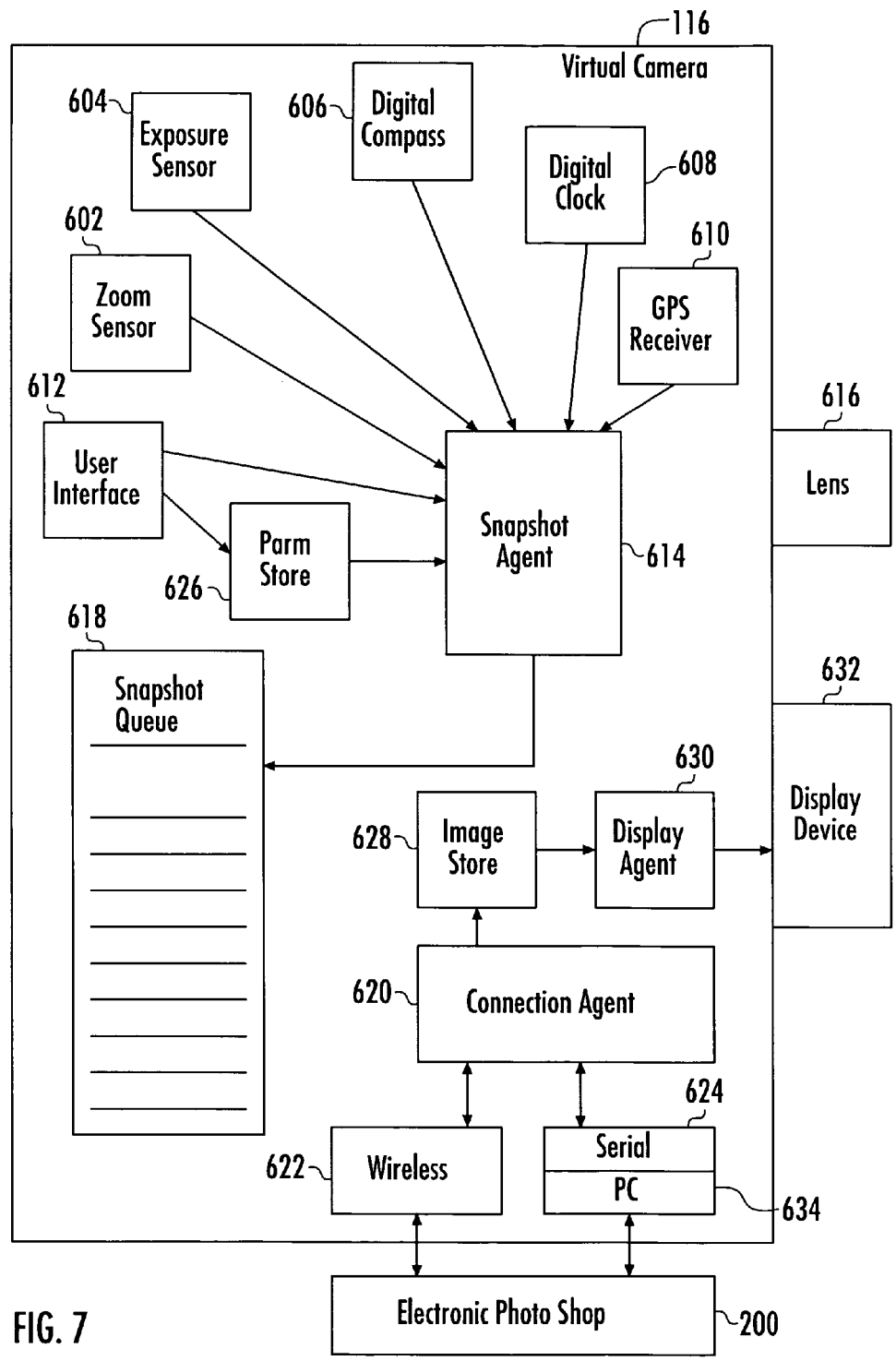
FIG. 7 is a block diagram of a more detailed example embodiment of a virtual camera, also including connections to an electronic photo shop.

A connection agent (620) in typical embodiments is one or more computer programs capable of retrieving image requests from a snapshot queue (618) and communicating the image requests to an electronic photo shop (200). As illustrated in FIG. 7, some embodiments of virtual cameras include display devices (632) capable of displaying digital images. In such embodiments, connection agents (620) typically include also the capability of receiving requested digital images (628) back from an electronic photo shop and passing the digital images to a display agent (630) for display on the display device. Display agents in such embodiments typically comprise one or more computer programs capable of retrieving digital images from digital image storage (628) and displaying them on a display device (632) comprising part of the virtual camera (116). Examples of display devices useful with the present invention include video screens and liquid crystal displays. There are many display devices useful with the present invention that will occur to those of skill, and all such devices are well within the scope of the present invention.

Some embodiments of the present invention support entry through a user interface (612) of one or more, in some embodiments, all, of the image request data elements needed to create an image request. Such embodiments include, for example, personal computers, in which users can simply type in location coordinates, view direction, zoom, exposure, and so on, regardless of the physical location of the subject of an image request or snapshot and regardless of the physical location of the virtual camera. To use such an embodiment, a user can read location coordinates and view direction off a map, for example, and then simply type them in through a user interface. Such embodiments have little or no resemblance in form or function to a film camera. Other embodiments, however, tend more to resemble film cameras in form and function, having for example, viewers and data acquisition systems capable of automating the generation of image request data elements. FIG. 7 illustrates one such more detailed embodiment.

The more detailed embodiment illustrated in FIG. 7 includes a GPS receiver (610), that is, a Global Positioning System receiver, capable of providing precise location coordinates in digital form. In the more detailed embodiment shown in FIG. 7, a snapshot agent is programmed to read location coordinates directly from a GPS receiver integrated directly into the virtual camera itself. Similarly, the embodiment of FIG. 7 includes an electronic digital clock from which the snapshot agent is programmed to read directly the date and time of a snapshot or image request. The embodiment of FIG. 7 includes an electronic digital compass (606) from which the snapshot agent (614) is capable of reading directly the view direction of the virtual camera at the time when an image request is created. The embodiment of FIG. 7 includes an electronic exposure sensor (604) from which the snapshot agent (614) is capable of reading directly an exposure value. The embodiment of FIG. 7 includes an electronic zoom sensor (602) from which the snapshot agent is capable of reading directly a zoom value.

GPS receivers, electronic digital compasses, electronic exposure sensor, and the like, are optional additional features that tend to improve usefulness of a virtual camera for many purposes, although adding such features may increase the cost of particular embodiments. It is a useful advantage of many embodiments of the present invention, however, that virtual cameras can be very cost effective with respect to the quality of image to be produced, because the image quality is totally unrelated to the physical qualities of the virtual camera. More specifically, image quality is determined entirely in the electronic photo shop. This fact cuts hard against obsolescence of particular embodiments of virtual camera because advancements in imaging technology are embodied in electronic photo shops, not in the cameras.

As shown in FIG. 7, virtual cameras in typical embodiments include wireless (622) or serial (624) means for coupling for data communications to an electronic photo shop (200). Serial couplings (624) include couplings through ordinary serial or parallel ports on personal computer (634), as well as the newer USB connections, or Universal Serial Bus connections, capable of data transfer rates of up to 480 Mbps.

In addition to wired coupling through serial or parallel ports, many embodiments support wireless couplings for communications of image requests and return of requested images. Some wireless couplings are fairly location specific, such as Bluetooth, 802.11 connections, and infrared connections, in which the virtual camera would need to be fairly close to a personal computer or other device having a compliant wireless access point in order to effect a coupling for data communications. In such embodiments, as in the wired serial couplings, the virtual camera connects through the coupling to a personal computer, for example, which in turn connects to, for example, the Internet, and communicates one or more image requests to one or more electronic photo shops on the Internet. In such embodiments, it is typical for a user to take more than one snapshot in the form of stored image requests waiting in a snapshot queue on board a virtual camera, connect the virtual camera to a personal computer, and upload the image requests for processing at an electronic photo shop.

In other embodiments, wireless (622) means for coupling for data communications include wireless modems on analog cell phone channels or CDPD channels. CDPD, a digital data transmission technology developed for use on cellular phone frequencies, offers data transfer rates of up to 19.2 Kbps, quicker call set up compared to analog, and better error correction than using modems on an analog cellular channel. The advantage of embodiments using wireless modems, on analog channels or CDPD, is that connections a virtual camera to an electronic photo shop are effected at anytime, so long as the virtual camera is in an area covered by cellular phone service.

In addition to analog cell phone channels and CDPD, other long range wireless technologies are useful with various embodiments of virtual camera, including, for example, GPRS or General Packet Radio Service, a standard for wireless communications which runs at speeds up to 150 kilobits per second, and GSM or Global System for Mobile Communications, which operates typically at 9.6 kilobits per second. Other ways of effecting long range wireless couplings for data communications between virtual cameras and electronic photo shops will occur to those of skill in the art, and all such ways are well within the scope of the present invention.

Figure 10:
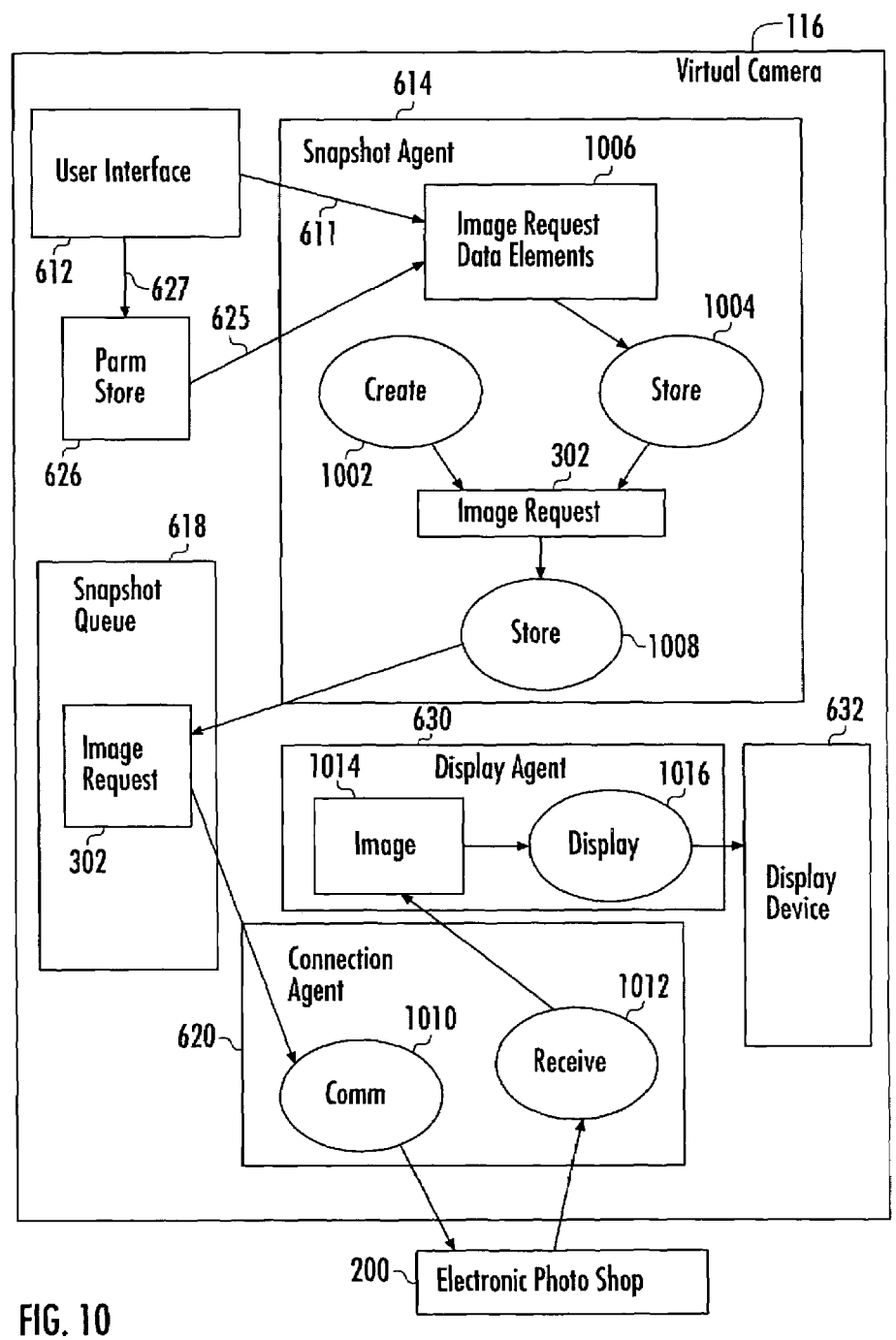
FIG. 10 is a control flow diagram illustrating method aspects of exemplary embodiments of virtual cameras.

Turning now to FIG. 10, a further aspect of the invention is illustrated as a method of digital imaging. In typical embodiments, the method is implemented through use of a virtual camera (116), wherein the virtual camera includes automated computing machinery operating under software program control, and a user interface (612). Typical embodiments include creating (1002) an image request (302) for a digital image and storing (1004) the image request data elements in the image request.

In typical embodiments of the invention, as shown in FIG. 4, the image request includes an image request data structure representing and describing the digital image, the image request data structure includes image request data elements (302), and the image request data elements include data elements for location coordinates and a data element for view direction (304, 306). In further embodiments, the image request data elements also include data elements for zoom (308), exposure (309), date (310), and time (312). In still further embodiments, the image request data elements include data elements for a network address of the virtual camera (316), delivery instructions (318), a user account identification code (320), and a device type (322).

Turning back to FIG. 10, typical embodiments of the invention are seen to include acquiring (611) at least one of the image request data elements (1006) through the user interface (612). In some embodiments, the user interface (612) includes a computer video screen and keyboard on a personal computer. In other embodiments, the user interface (612) comprises a touch-sensitive pad on a personal digital assistant. In typical embodiments, the virtual camera includes a parameter store (626), the parameter store including non-volatile computer memory. Typical embodiments of the invention also include acquiring (615) at least one of the image request data elements from a parameter store (626).

Figure 8:
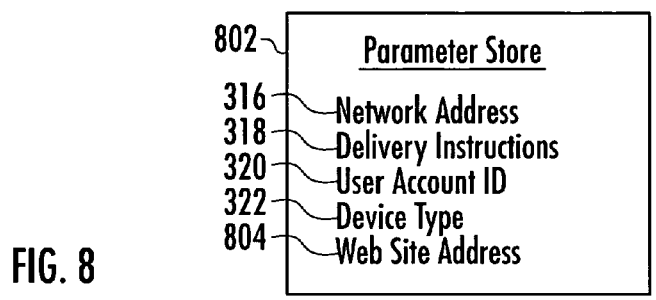
FIG. 8 is a data structure diagram illustrating an example embodiment of a parameter store.

Typical embodiments of the kind illustrated in FIG. 10 include entering (627) through a user interface (612), into the parameter store, default values for the image request data elements, the default values having in the parameter store, for example, a data structure as illustrated in FIG. 8. Typical embodiments also include storing the image request in a snapshot queue (618), the snapshot queue comprising computer memory in the virtual camera. Typical embodiments further include coupling, for data communications, the virtual camera to a Web site for imaging for virtual cameras (200) and communicating (1010) the image request (302) from the virtual camera to a Web site for imaging for virtual cameras (200). In some embodiments, the virtual camera includes a display device (632), and the method of the invention includes receiving (1012) a digital image (1014) from the Web site (200) and displaying (1016) the digital image on the display device (632).

Figure 11:
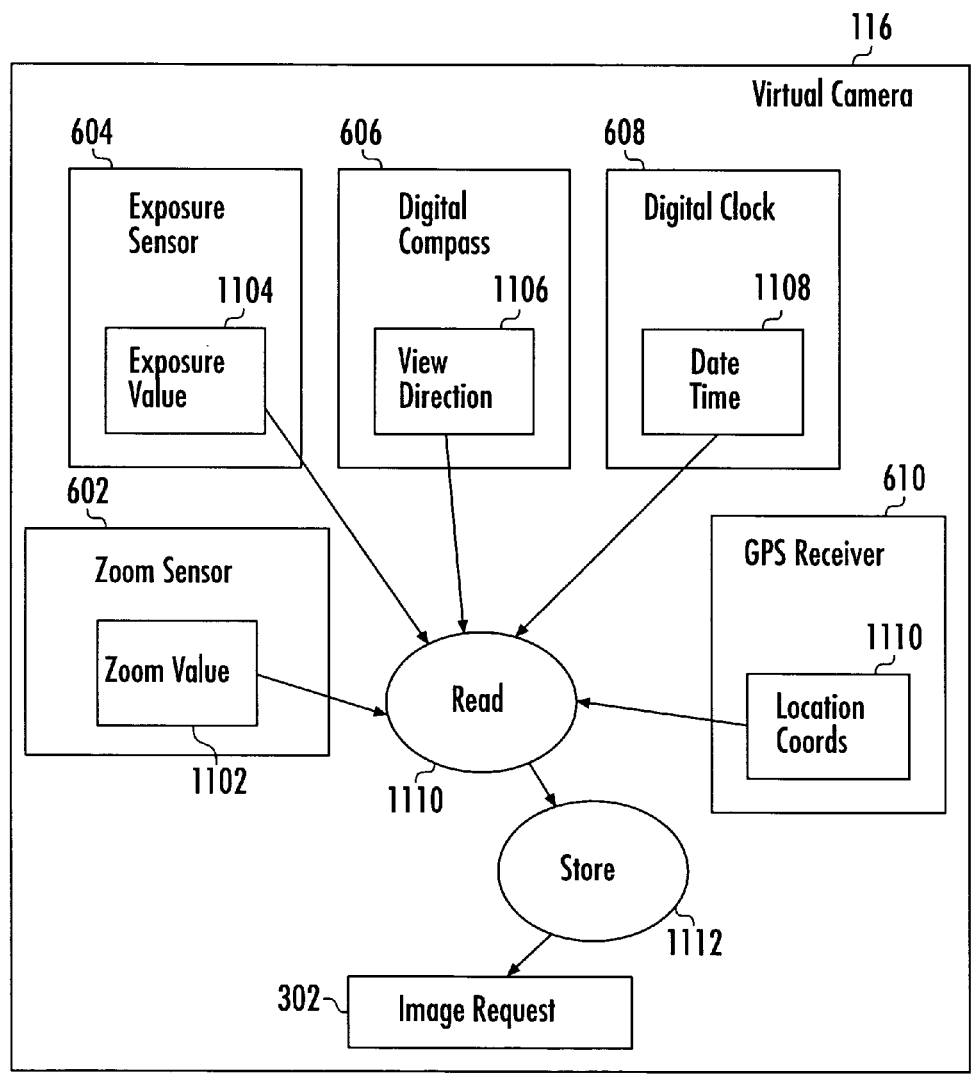
FIG. 11 is a more detailed control flow diagram illustrating method aspects of exemplary embodiments of virtual cameras.

In some embodiments of the kind illustrated in FIG. 11, the image request data elements include at least one data element for location coordinates and the virtual camera includes a GPS receiver (610). Such embodiments typically include reading (1110) location coordinates values (1110) from the GPS receiver and storing (1112) the location coordinates values in the image request (302). In other embodiments, the image request data elements also include a data element for view direction, and the virtual camera includes a digital compass (606). Such embodiments typically include reading (1110) a view direction value (1106) from the digital compass and storing (1112) the view direction value in the image request (302). In many embodiments, the image request data elements further include data elements for date and time, and the virtual camera includes a digital clock (608). Such embodiments typically include reading (1110) date and time values (1108) from the digital clock and storing (1112) the date and time values in the image request (302).

Figure 9:
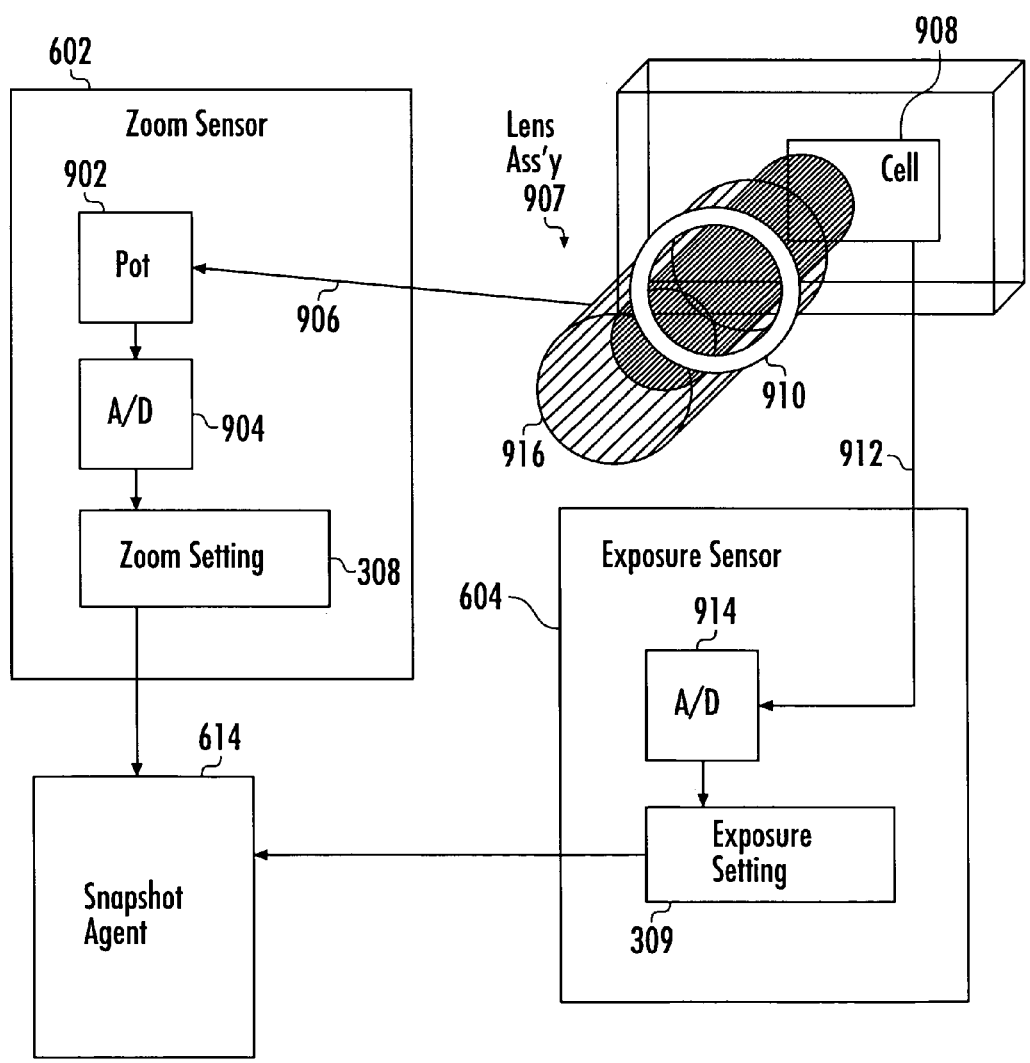
FIG. 9 is a block diagram of example embodiments of a zoom sensor and an exposure sensor.

In many embodiments of the kind illustrated in FIG. 9, the image request data elements include a data element for zoom and the virtual camera includes a lens assembly (907) having a first moveable element (916) and a zoom sensor (602). In such embodiments, the zoom sensor typically includes a potentiometer (902) having a wiper and a wiper contact (not shown), wherein the wiper is moveably coupled (906) to the first moveable element of the lens assembly (916). Such embodiments typically include an analog-to-digital converter (904) electrically coupled to the wiper contact of the potentiometer (902).

In many embodiments of the invention, as shown in FIG. 11, the image request data elements include a data element for zoom, and the virtual camera includes a zoom sensor (602). Such embodiments typically include reading (1110) a zoom value (1102) from the zoom sensor and storing (1112) the zoom value in the image request (302).

In many embodiments of the invention, as shown in FIG. 9, the image request data elements include a data element for exposure. In such embodiments, the virtual camera typically includes a lens assembly (907) having a second moveable element (910), and the second moveable element has the capability of adjusting the amount of light passing through a light path through the lens assembly. Such embodiments typically include an exposure sensor (604). In such embodiments, the exposure sensor typically includes a photocell (908) positioned in the light path through the lens assembly (907), and the photocell includes an electrical output contact (not shown). Such embodiments typically include an analog-to-digital converter (914) electrically coupled (912) to the electrical output contact of the photocell.

In many embodiments of the kind illustrated in FIG. 11, the image request data elements include a data element for exposure, and the virtual camera includes an exposure sensor (604). Such embodiments include reading (1110) an exposure value (1104) from the exposure sensor and storing (1112) the exposure value in the image request (302).

It will be understood from the foregoing description that various modifications and changes may be made in the exemplary embodiments of the present invention without departing from its true spirit. The descriptions in this specification are for purposes of illustration only and should not be construed in a limiting sense. The scope of the present invention should be limited only by the language of the following claims.

What is claimed is:

1. A computer-implemented method of digital imaging, the method implemented through use of a virtual camera, wherein the virtual camera comprises automated computing machinery operating under software program control, wherein the virtual camera includes a user interface, a display device, a lens assembly having a first moveable element; a zoom sensor, the zoom sensor further comprising a potentiometer having a wiper and a wiper contact, wherein the wiper is moveably coupled to the first moveable element of the lens assembly; and an analog-to-digital converter electrically coupled to the wiper contact of the potentiometer; the method comprising the steps of:
creating an image request for an existing digital image, wherein the image request comprises an image request data structure representing and describing the digital image, wherein the image request data structure comprises image request data elements, wherein the image request data elements comprise data elements for location coordinates and a data element for view direction, wherein the image request data elements further comprise a data element for zoom;
storing the image request data elements in the image request;
communicating the image request from the virtual camera to a Web site for imaging for virtual cameras;
receiving a digital image from the Web site; and
displaying the digital image on the display device.

2. The method of claim 1 wherein the image request data elements further comprise data elements for zoom, exposure, date, and time.

3. The method of claim 1 wherein the image request data elements further comprise data elements for a network address of the virtual camera, delivery instructions, a user account identification code, and a device type.

4. The method of claim 1 further comprising acquiring at least one of the image request data elements through the user interface.

5. The method of claim 1 wherein the user interface comprises a computer video screen and keyboard on a personal computer.

6. The method of claim 1 wherein the user interface comprises a touch-sensitive pad on a personal digital assistant.

7. The method of claim 1 wherein the virtual camera further comprises a parameter store, the parameter store further comprising non-volatile computer memory.

8. The method of claim 1 further comprising acquiring at least one of the image request data elements from a parameter store.

9. The method of claim 1 wherein the virtual camera further comprises a parameter store, and the method further comprises entering through a user interface, into the parameter store, default values for the image request data elements.

10. The method of claim 1 further comprising storing the image request in a snapshot queue, the snapshot queue comprising computer memory in the virtual camera.

11. The method of claim 1 further comprising coupling, for data communications, the virtual camera to a Web site for imaging for virtual cameras.

12. The method of claim 1 wherein the image request data elements further comprise at least one data element for location coordinates; wherein the virtual camera further comprises a GPS receiver; and the method comprises the further steps of:
reading location coordinates values from the GPS receiver; and
storing the location coordinates values in the image request.

13. The method of claim 1 wherein the image request data elements further comprise a data element for view direction; wherein the virtual camera further comprises a digital compass; and the method comprises the further steps of:
reading a view direction value from the digital compass; and
storing the view direction value in the image request.

14. The method of claim 1 wherein the image request data elements further comprise data elements for date and time; wherein the virtual camera further comprises a digital clock; and the method comprises the further steps of:
reading date and time values from the digital clock; and
storing the date and time values in the image request.

15. The method of claim 1 wherein:
the image request data elements further comprise a data element for zoom;
the virtual camera further comprises a zoom sensor; and
the method comprises the further steps of:
reading a zoom value from the zoom sensor; and
storing the zoom value in the image request.

16. The method of claim 10 wherein the image request data elements further comprise a data element for exposure; and wherein the virtual camera further comprises:
a lens assembly having a second moveable element, the second moveable element having the capability of adjusting the amount of light passing through a light path through the lens assembly; and
an exposure sensor, the exposure sensor comprising:
a photocell positioned in the light path through the lens assembly, wherein the photocell includes an electrical output contact; and
an analog-to-digital converter electrically coupled to the electrical output contact of the photocell.

17. The method of claim 1 wherein:
the image request data elements further comprise a data element for exposure;
the virtual camera further comprises an exposure sensor; and
the method comprises the further steps of:
reading an exposure value from the exposure sensor; and
storing the exposure value in the image request.

18. A virtual camera comprising:
a display device;
a lens assembly having a first moveable element;
a zoom sensor, the zoom sensor further comprising:
a potentiometer having a wiper and a wiper contact, wherein the wiper is moveably coupled to the first moveable element of the lens assembly;
an analog-to-digital converter electrically coupled to the wiper contact of the potentiometer;
automated computing machinery operating under software program control, further comprising one or more computer processors coupled to computer memory;
a user interface;
means far creating an image request for an existing digital image, wherein the image request comprises an image request data structure representing and describing the digital image, wherein the image request data structure comprises image request data elements, wherein the image request data elements comprise data elements for location coordinates and a data element for view direction, wherein the image request data elements further comprise a data element for zoom;
means for storing the image request data elements in the image request;
means for communicating the image request from the virtual camera to a Web site for imaging for virtual cameras;
means for receiving a digital image from the Web site; and
means for displaying the digital image on a display device.

19. The virtual camera of claim 18 wherein the image request data elements further comprise data elements for zoom, exposure, date, and time.

20. The virtual camera of claim 18 wherein the image request data elements further comprise data elements for a network address of the virtual camera, delivery instructions, a user account identification code, and a device type.

21. The virtual camera of claim 18 further comprising means for acquiring at least one of the image request data elements through the user interface.

22. The virtual camera of claim 18 wherein the user interface comprises a computer video screen and keyboard on a personal computer.

23. The virtual camera of claim 21 wherein the user interface comprises a touch-sensitive pad on a personal digital assistant.

24. The virtual camera of claim 18 wherein the virtual camera further comprises a parameter store, the parameter store further comprising nun-volatile computer memory.

25. The virtual camera of claim 18 further comprising means for acquiring at least one of the image request data elements from a parameter store.

26. The virtual camera of claim 18 wherein the virtual camera further comprises a parameter store, and the virtual camera further comprises means for entering through a user interface, into the parameter store, default values for the image request data elements.

27. The virtual camera of claim 18 further comprising means for storing the image request in a snapshot queue, the snapshot queue comprising computer memory in the virtual camera.

28. The virtual camera of claim 18 further comprising means for coupling, for data communications, the virtual camera to a Web site for imaging for virtual cameras.

29. The virtual camera of claim 18 wherein the image request data elements further comprise at least one data element for location coordinates and the virtual camera further comprises:
a GPS receiver;
means for reading location coordinates values from the GPS receiver; and
means for storing the location coordinates values in the image request.

30. The virtual camera of claim 18 wherein the image request data elements further comprise a data element for view direction and the virtual camera further comprises:
a digital compass;
means for reading a view direction value from the digital compass; and
means for storing the view direction value in the image request.

31. The virtual camera of claim 18 wherein the image request data elements further comprise data elements for date and time and the virtual camera further comprises:
a digital clock;
means for reading date and time values from the digital clock; and
means for storing the date and time values in the image request.

32. The virtual camera of claim 18 wherein the image request data elements further comprise a data element for zoom and the virtual camera further comprises:
a zoom sensor;
means for reading a zoom value from the zoom sensor; and
means for storing the zoom value in the image request.

33. The system of claim 27 wherein the image request data elements further comprise a data element for exposure and the virtual camera further comprises:
a lens assembly having a second moveable element, the second moveable element having the capability of adjusting the amount of light passing through a light path through the lens assembly; and
an exposure sensor, the exposure sensor comprising:
a photocell positioned in the light path through the lens assembly, wherein the photocell includes an electrical output contact; and
an analog-to-digital converter electrically coupled to the electrical output contact of the photocell.

34. The virtual camera of claim 18 wherein the image request data elements further comprise a data element for exposure and the virtual camera further comprises:
an exposure sensor;
means for reading an exposure value from the exposure sensor; and
means for storing the exposure value in the image request.

35. A computer program product of digital imaging, the computer program product implemented through use of a virtual camera, wherein the virtual camera comprises automated computing machinery operating under software program control, wherein the virtual camera includes a user interface, a display device, a lens assembly having a first moveable element, a zoom sensor, the zoom sensor further comprising;
a potentiometer having a wiper and a wiper contact, wherein the wiper is moveably coupled to the first moveable element of the lens assembly; and
an analog-to-digital converter electrically coupled to the wiper contact of the potentiometer;
the computer program product comprising:
a recording medium;
means, recorded on the recording medium, for creating an image request for an existing digital image, wherein the image request comprises an image request data structure representing and describing the digital image, wherein the image request data structure comprises image request data elements, wherein the image request data elements comprise data elements for location coordinates and a data element for view direction, and wherein the image request data elements further comprise a data element for zoom;
means, recorded on the recording medium, for storing the image request data elements in the image request;
means, recorded on the recording medium, for communicating the image request from the virtual camera to a Web site for imaging for virtual cameras;
means, recorded on the recording medium, for receiving a digital image from the Web site; and
means, recorded on the recording medium, for displaying the digital image on the display device.

36. The computer program product of claim 35 wherein the image request data elements further comprise data elements for zoom, exposure, date, and time.

37. The computer program product of claim 35 wherein the image request data elements further comprise data elements for a network address of the virtual camera, delivery instructions, a user account identification code, and a device type.

38. The computer program product of claim 35 further comprising means, recorded on the recording medium, for acquiring at least one of the image request data elements through the user interface.

39. The computer program product of claim 35 wherein the user interface comprises a computer video screen and keyboard on a personal computer.

40. The computer program product of claim 35 wherein the user interface comprises a touch-sensitive pad on a personal digital assistant.

41. The computer program product of claim 35 wherein the virtual camera further comprises a parameter store, the parameter store further comprising non-volatile computer memory.

42. The computer program product of claim 35 further comprising means, recorded on the recording medium, for acquiring at least one of the image request data elements from a parameter store.

43. The computer program product of claim 35 wherein the virtual camera further comprises a parameter store, and the computer program product further comprises means, recorded on the recording medium, for entering through a user interface, into the parameter store, default values for the image request data elements.

44. The computer program product of claim 35 further comprising means, recorded on the recording medium, for storing the image request in a snapshot queue, the snapshot queue comprising computer memory in the virtual camera.

45. The computer program product of claim 35 further comprising means, recorded on the recording medium, for coupling, for data communications, the virtual camera to a Web site for imaging for virtual cameras.

46. The computer program product of claim 35 wherein the image request data elements further comprise at least one data element for location coordinates;
    wherein the virtual camera further comprises a GPS receiver; and the computer program product comprises:
    means, recorded on the recording medium, for reading location coordinates values from the GPS receiver; and
    means, recorded on the recording medium, for storing the location coordinates values in the image request.

47. The computer program product of claim 35 wherein the image request data elements further comprise a data element for view direction; wherein the virtual camera further comprises a digital compass; and the computer program product comprises:
    means, recorded on the recording medium, for reading a view direction value from the digital compass; and
    means, recorded on the recording medium, for storing the view direction value in the image request.

48. The computer program product of claim 35 wherein the image request data elements farther comprise data elements for date and time; wherein the virtual camera further comprises a digital clock; and the computer program product comprises:
    means, recorded on the recording medium, for reading date and time values from the digital clock; and
    means, recorded on the recording medium, for storing the date and time values in the image request.

49. The computer program product of claim 35 wherein:
    the image request data elements further comprise a data element for zoom;
    the virtual camera further comprises a zoom sensor; and the computer program product comprises:
    means, recorded on the recording medium, for reading a zoom value from the zoom sensor; and
    means, recorded on the recording medium, for storing the zoom value in the image request.

50. The computer program product of claim 44 wherein the image request data elements further comprise a data element for exposure; and wherein the virtual camera further comprises:
    a lens assembly having a second moveable element, the second moveable element having the capability of adjusting the amount of light passing through a light path through the lens assembly; and
    an exposure sensor, the exposure sensor comprising:
    a photocell positioned in the light path through the lens assembly, wherein the photocell includes an electrical output contact; and
    an analog-to-digital converter electrically coupled to the electrical output contact of the photocell.

51. The computer program product of claim 35 wherein:
    the image request data elements further comprise a data element for exposure;
    the virtual camera further comprises an exposure sensor; and
    the computer program product comprises:
    means, recorded on the recording medium, for reading an exposure value from the exposure sensor; and
    means, recorded on the recording medium, for storing the exposure value in the image request.

* * * * *

UNITED STATES PATENT AND TRADEMARK OFFICE
CERTIFICATE OF CORRECTION

| | | |
|---|---|---|
| PATENT NO. | : 7,027,073 B2 | Page 1 of 1 |
| APPLICATION NO. | : 09/961993 | |
| DATED | : April 11, 2006 | |
| INVENTOR(S) | : William Kress Bodin and Derral Charles Thorson | |

It is certified that error appears in the above-identified patent and that said Letters Patent is hereby corrected as shown below:

Column 17, Line 30, Claim 27, delete "nun-volatile" and insert --non-volatile--.

Signed and Sealed this

Eighteenth Day of July, 2006

JON W. DUDAS
*Director of the United States Patent and Trademark Office*